(12) United States Patent
Hung et al.

(10) Patent No.: US 11,030,435 B1
(45) Date of Patent: Jun. 8, 2021

(54) IMAGE SENSING METHOD AND SYSTEM

(71) Applicant: NOVATEK Microelectronics Corp., Hsin-Chu (TW)

(72) Inventors: Ting-Hsuan Hung, Hsinchu (TW); Wei-Lun Shih, Hsinchu (TW); Wu-Wei Lin, Taoyuan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/828,918

(22) Filed: Mar. 24, 2020

(51) Int. Cl.
*G06K 9/00* (2006.01)
*G06K 9/03* (2006.01)
*G06K 9/20* (2006.01)

(52) U.S. Cl.
CPC ............. *G06K 9/0004* (2013.01); *G06K 9/03* (2013.01); *G06K 9/209* (2013.01)

(58) Field of Classification Search
CPC ......... G06K 9/0004; G06K 9/03; G06K 9/209
See application file for complete search history.

(56) References Cited

U.S. PATENT DOCUMENTS

2016/0171274 A1* 6/2016 Franza ............... G06K 9/00087
382/124
2016/0239700 A1* 8/2016 Yang .................... G06K 9/0002

FOREIGN PATENT DOCUMENTS

CN 105469066 A * 4/2016

* cited by examiner

*Primary Examiner* — Abhishek Sarma
(74) *Attorney, Agent, or Firm* — Winston Hsu

(57) ABSTRACT

A method of sensing an image from a panel for an image sensing circuit includes the steps of: transmitting a first voltage or current to the panel; receiving a plurality of sensing signals from the panel, wherein the plurality of sensing signals correspond to the first voltage or current; determining whether the plurality of sensing signals conform to an operation range of the image sensing circuit; and adjusting the first voltage or current when the plurality of sensing signals are determined to be not conform to the operation range of the image sensing circuit.

36 Claims, 12 Drawing Sheets

IMAGE SENSING METHOD AND SYSTEM

BACKGROUND OF THE INVENTION

1. Field of the Invention

The present invention relates to an image sensing method and system, and more particularly, to an image sensing method and system for fingerprint image sensing.

2. Description of the Prior Art

Fingerprint recognition technology is widely applied in a variety of electronic products such as a mobile phone, laptop, tablet, personal digital assistant (PDA), and portable electronics, for realizing identity recognition. The fingerprint sensing allows a user to perform identity recognition conveniently, where the user only needs to put his/her finger on a fingerprint sensing pad or area to login the electronic device instead of entering long and tedious username and password.

In recent years, the optical fingerprint recognition has become one of the most popular fingerprint recognition schemes. The optical fingerprint sensing pixels may be spread over the entire screen, so that fingerprint image may be sensed on any place of the screen during display time, to realize in-display fingerprint sensing. After light exposure, the light sensing elements included in the sensing pixels may generate fingerprint sensing signals that reflect the exposure light intensity. The information of fingerprint sensing signals may be sent to the fingerprint sensing circuit through sensing lines, to be received and detected by the fingerprint sensing circuit.

However, the fingerprint sensing circuit usually has a limited operation range. If the received fingerprint sensing signals are beyond the operation range, the fingerprint image may not be correctly detected and determined. Note that the fingerprint sensing signals of the optical fingerprint sensor are highly influenced by ambient light and exposure time. The conventional method usually controls the exposure time to be adapted to the ambient light received by the light sensing elements, but this method requires that the entire fingerprint image should be determined by a host and then the exposure time may be adjusted to perform exposure again. The iterations of exposure and processing time of the host are time consuming, which reduces the user experience of fingerprint recognition. Thus, there is a need for improvement over the prior art.

SUMMARY OF THE INVENTION

It is therefore an objective of the present invention to provide a novel image sensing method and system, in order to solve the abovementioned problem.

An embodiment of the present invention discloses a method of sensing an image from a panel for an image sensing circuit. The method comprises the steps of: transmitting a first voltage or current to the panel; receiving a plurality of sensing signals from the panel, wherein the plurality of sensing signals correspond to the first voltage or current; determining whether the plurality of sensing signals conform to an operation range of the image sensing circuit; and adjusting the first voltage or current when the plurality of sensing signals are determined to be not conform to the operation range of the image sensing circuit.

Another embodiment of the present invention discloses an image sensing system. The image sensing system comprises a panel and an image sensing circuit. The panel comprises a plurality of sensing pixels. The image sensing circuit, coupled to the panel, comprises a voltage or current source, a receiver and a control circuit. The voltage or current source is configured to transmit a first voltage or current to the panel. The receiver is configured to receive a plurality of sensing signals from the panel, wherein the plurality of sensing signals correspond to the first voltage or current. The control circuit, coupled to the voltage or current source and the receiver, is configured to determine whether the plurality of sensing signals conform to an operation range of the image sensing circuit, and adjust the first voltage or current when the plurality of sensing signals are determined to be not conform to the operation range of the image sensing circuit.

Another embodiment of the present invention discloses an image sensing circuit, which comprises a voltage or current source, a receiver and a control circuit. The voltage or current source is configured to transmit a first voltage or current to a panel. The receiver is configured to receive a plurality of sensing signals from the panel, wherein the plurality of sensing signals correspond to the first voltage or current. The control circuit, coupled to the voltage or current source and the receiver, is configured to determine whether the plurality of sensing signals conform to an operation range of the image sensing circuit, and adjust the first voltage or current when the plurality of sensing signals are determined to be not conform to the operation range of the image sensing circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
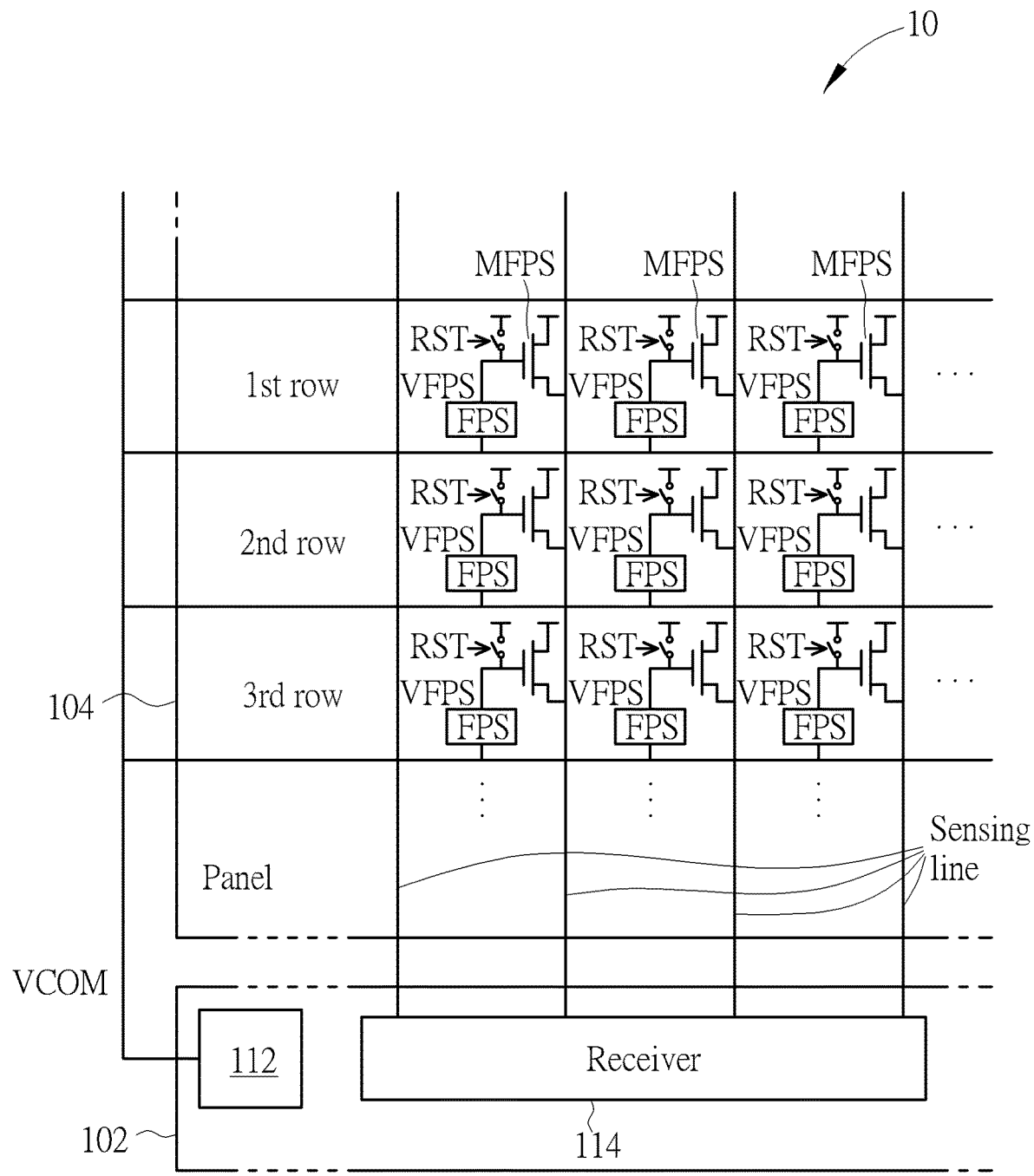
FIG. 1 is a schematic diagram of an image sensing system according to an embodiment of the present invention.

Please refer to FIG. 1, which is a schematic diagram of an image sensing system 10 according to an embodiment of the present invention. As shown in FIG. 1, the image sensing system 10 includes an image sensing circuit 102 and a panel 104. The image sensing circuit 102 may be an integrated circuit (IC) capable of receiving and processing image sensing signals from the panel 104. The image sensing circuit 102 may include a voltage generator 112 and a receiver 114. The voltage generator 112, which may be a voltage regulator, is configured to generate and output a common voltage VCOM to the panel 104. The receiver 114 is coupled to the panel 104 through a plurality of sensing lines, for receiving the image sensing signals such as voltage or current signals from the panel 104. In an embodiment, the panel 104 is capable of performing fingerprint image sensing, and the image sensing signals received from the panel 104 may be fingerprint image signals.

In an embodiment, the image sensing system 10 may further include a host (not illustrated) coupled to the image sensing circuit 102. The host, which may be the core processor of the system such as a central processing unit (CPU), a microprocessor, a microcontroller unit (MCU) or the like, is configured to receive information of the image sensing signals from the panel 104, to perform follow-up determination and recognition of the image sensing signals. For example, when the image sensing signals are fingerprint image signals, the host may perform fingerprint recognition based on the information of peak and valley carried in the fingerprint image signals.

The panel 104 includes a plurality of sensing pixels arranged as an array. If the panel 104 is capable of in-display fingerprint sensing function, the sensing pixels may be spread over the entire screen, allowing the fingerprint image to be sensed on any place of the screen. As shown in FIG. 1, each sensing pixel may include an image sensing element, a reset switch RST, and a control transistor MFPS. The image sensing element may be an optical fingerprint sensor (FPS), which may be any type of light sensing element such as a photodiode. The reset switch RST, which may be implemented with a transistor, is configured to reset a sensing voltage VFPS of the image sensing element to a reset voltage VRST. The control transistor MFPS may convert the sensing voltage VFPS into a voltage or current signal to be received by the image sensing circuit 102 through the sensing lines.

Since the image sensing system 10 of the present invention is an optical image sensor, the image sensing signals may be obtained from light exposure of the image sensing element. As for fingerprint image sensing, the panel 104, such as a liquid crystal display (LCD) panel, may deliver light from the backlight module. When a finger is put on a specific area of the panel 104, the light reflected from the finger may be received by the image sensing element, to change the level of the sensing voltage VFPS of the image sensing element, which is the so-called "exposure". The light reflected from the finger may carry the information of fingerprint peak and valley, so that the sensing signals in different pixels may have a tiny difference with respect to the peak or valley. The fingerprint image may thereby be determined.

Figure 2:
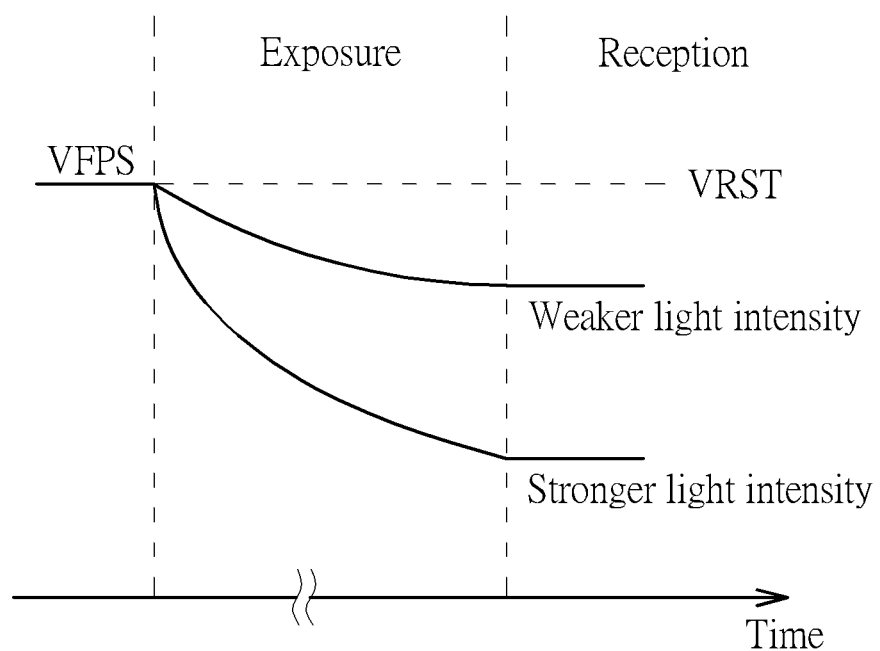
FIG. 2 is a waveform diagram of the sensing voltage during the exposure process.

In detail, please refer to FIG. 2, which is a waveform diagram of the sensing voltage VFPS during the exposure process. First, the reset switch RST is conducted to precharge the sensing voltage VFPS to the reset voltage VRST. The exposure process then starts, where the image sensing element discharges the sensing voltage VFPS based on the light intensity sensed by the image sensing element, so that the sensing voltage VFPS may continuously decrease with a speed corresponding to the sensed light intensity. With stronger light intensity sensed by the image sensing element, the sensing voltage VFPS may decrease to a lower level. After the exposure period finishes, the level of the sensing voltage VFPS in each sensing pixel may be received by the image sensing circuit 102, and thus the reflected light intensity at the position of each sensing pixel may be obtained. After the sensing signals of the sensing pixels in the area of finger touch are obtained, the host may generate an entire fingerprint image and then perform recognition.

Figure 3A:
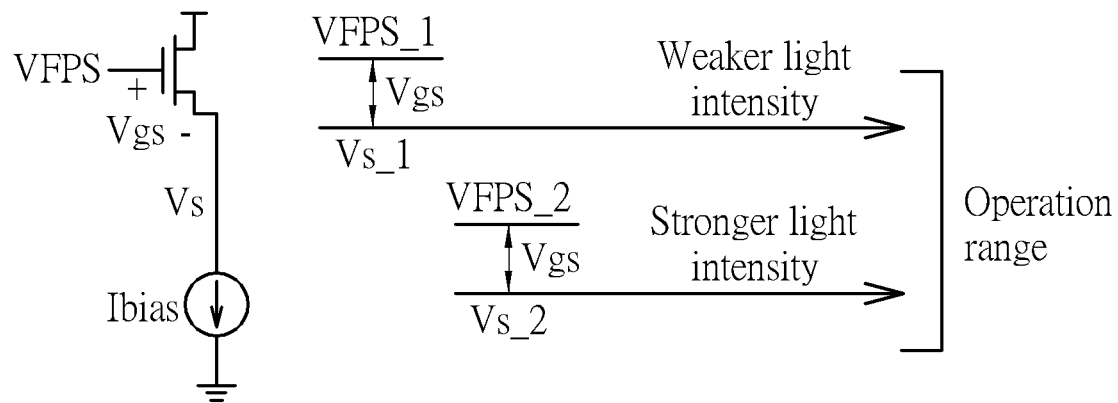
FIGS. 3A and 3B are schematic diagrams of the voltage mode sensing and the current mode sensing, respectively.
Figure 3B:
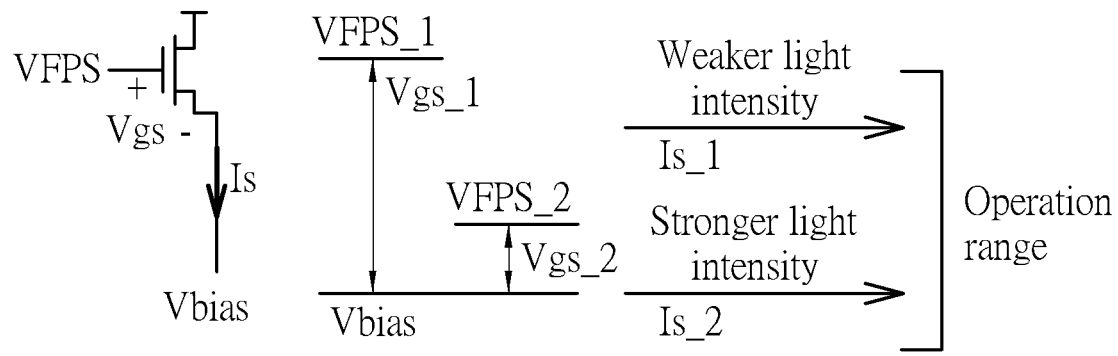

There are two methods for the image sensing circuit 102 to obtain the information of the sensing voltage VFPS: the voltage mode sensing and the current mode sensing. FIGS. 3A and 3B illustrate the voltage mode sensing and the current mode sensing, respectively. As shown in FIG. 3A, the image sensing circuit 102 may send a fixed bias current Ibias to the sensing line, and thereby receive a sensing voltage Vs from the source terminal of the control transistor MFPS through the sensing line. In detail, the bias current Ibias may be identical to the drain-to-source current Ids of the control transistor MFPS coupled to the sensing line. According to the metal oxide semiconductor field-effect transistor (MOSFET) equation as shown in FIG. 3A, with the fixed bias current Ibias (while the parameters such as the average carrier mobility $\mu_0$, gate oxide capacitance $C_{ox}$, channel width-to-length ratio W/L, and threshold voltage Vt are fixed parameters), the gate-to-source voltage Vgs of the control transistor MFPS may be a fixed value; hence, the sensing voltage VFPS at the gate terminal of the control transistor MFPS and the sensing voltage Vs at the source terminal of the control transistor MFPS may have a fixed voltage difference. As shown in FIG. 3A, when the sensed light intensity is weaker, the sensing voltage VFPS may be higher (e.g., VFPS_1) after the end of exposure period, and thus the sensing voltage Vs received by the image sensing circuit 102 may also be higher (e.g., Vs_1); when the sensed light intensity is stronger, the sensing voltage VFPS may be lower (e.g., VFPS_2) after the end of exposure period, and thus the sensing voltage Vs received by the image sensing circuit 102 may also be lower (e.g., Vs_2).

FIG. 3B illustrates the current mode sensing. As shown in FIG. 3B, the image sensing circuit 102 may send a fixed bias voltage Vbias to the sensing line, and thereby receive a sensing current Is from the source terminal of the control transistor MFPS through the sensing line. In detail, the bias voltage Vbias may be coupled to the source terminal of the control transistor MFPS. According to the MOSFET equation as shown in FIG. 3B, with the fixed bias voltage Vbias (while the parameters such as the average carrier mobility $\mu_0$, gate oxide capacitance $C_{ox}$, channel width-to-length ratio W/L, and threshold voltage Vt are fixed parameters), the sensing current Is may have a positive correlation to the sensing voltage VFPS. As shown in FIG. 3B, when the sensed light intensity is weaker, the sensing voltage VFPS may be higher (e.g., VFPS_1) after the end of exposure period, resulting in a higher gate-to-source voltage Vgs of the control transistor MFPS (e.g., Vgs_1), and thus the sensing current Is received by the image sensing circuit 102 may also be higher (e.g., Is_1); when the sensed light intensity is stronger, the sensing voltage VFPS may be lower (e.g., VFPS_2) after the end of exposure period, resulting in a lower gate-to-source voltage Vgs of the control transistor MFPS (e.g., Vgs_2), and thus the sensing current Is received by the image sensing circuit 102 may also be lower (e.g., Is_2).

Please note that the voltage or current sensing signals (Vs or Is) generated from the sensing pixels reflect the light intensity sensed by the image sensing element. The sensed light intensity is highly influenced by the ambient light, causing that the voltage or current sensing signals may become out of the operation range of the image sensing circuit 102. Take the voltage mode sensing as an example. As shown in FIG. 3A, the sensing voltages Vs_1 and Vs_2 are within the operation range of the image sensing circuit 102. If fingerprint sensing is performed in the outdoors, the ambient light with high brightness may be sensed by the image sensing element during the exposure period, such that the sensing voltage VFPS may rapidly decrease and the sensing voltage Vs may fall below the operation range of the image sensing circuit 102. On the other hand, if fingerprint sensing is performed in a dark room, the sensing voltage Vs may be quite high to be above the operation range of the image sensing circuit 102.

The operation range of the image sensing circuit 102 may be an input voltage or current range recognizable or receivable by the image sensing circuit 102. In an embodiment, the receiver 114 may be implemented as an analog front-end (AFE) circuit or included in an AFE circuit, and the operation range of the image sensing circuit 102 may be the input range of the AFE circuit, such as the input voltage range or input current range receivable by the AFE circuit. For example, the AFE circuit may operate by receiving a power supply voltage (e.g; 5V) and a ground voltage (e.g., 0V), so that the maximum possible input voltage range of the AFE circuit may be between 0V and 5V. If the image sensing element operates in the outdoors and bright ambient light is sensed, the generated voltage or current signal may be excessively low, to be lower than the input voltage range of the AFE circuit (such as lower than 0V); hence, the AFE circuit may not successfully process the received signal and/or the light intensity reflected from the finger may not be correctly determined.

In an embodiment, the image sensing circuit 102 may further include an analog-to-digital converter (ADC) coupled to the AFE circuit, to convert the analog signal received from the AFE circuit into digital data. Therefore, the operation range of the image sensing circuit 102 may be the input range of the ADC, which is the input voltage or current recognizable by the ADC. For example, if strong ambient light is sensed and the sensing voltage or current signal from each sensing pixel is excessively low, the voltage or current signal received by the ADC may be lower than its input range, causing that the output data of the ADC will be the minimum digital code for each sensing pixel. In such a situation, the peak and valley information of fingerprint will not be correctly reflected in the output data of the ADC.

Figure 4:
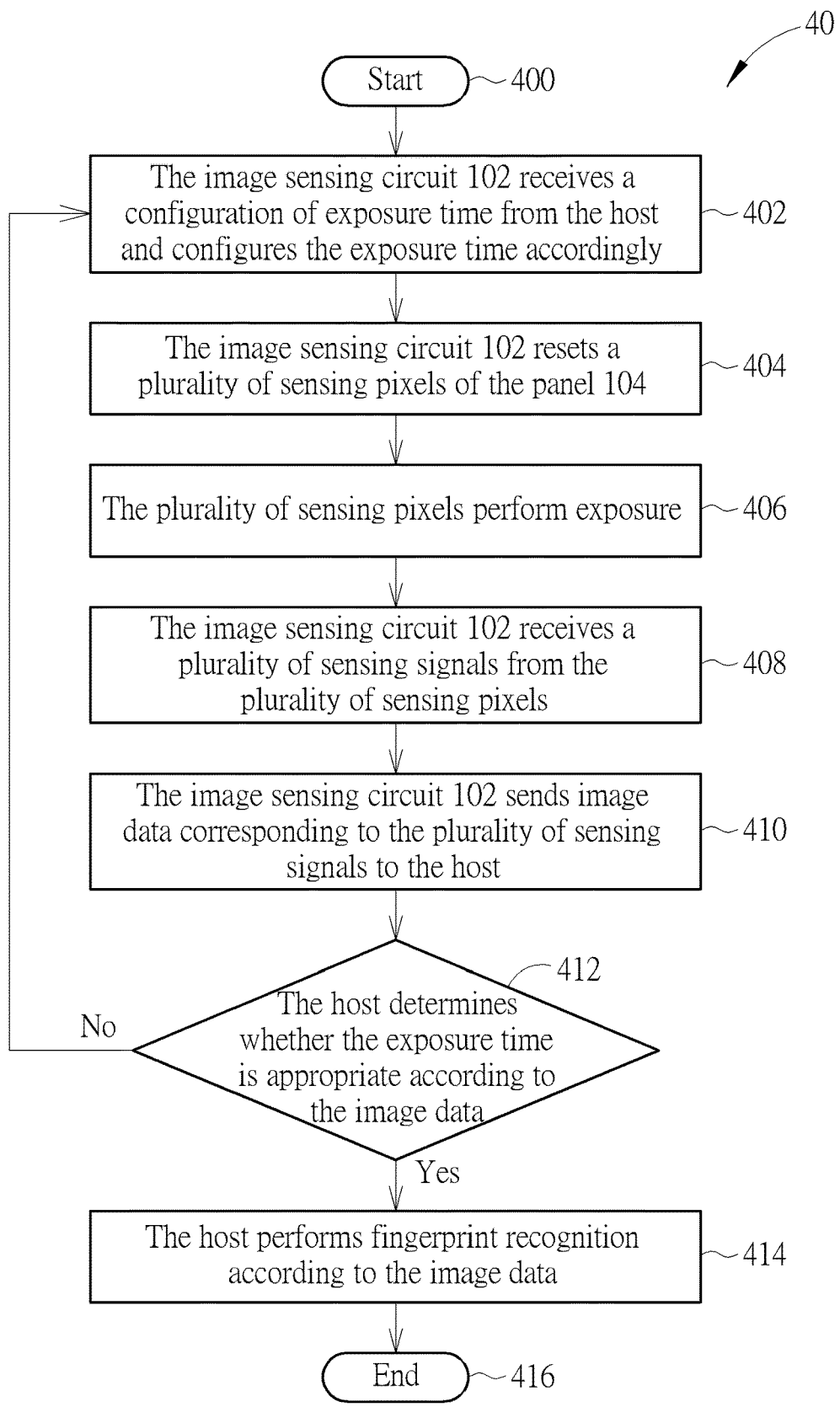
FIG. 4 is a flowchart of a general image sensing process.

In order to be adaptive to the large range of sensed light intensity between indoor and outdoor applications, the AFE circuit and the ADC may be designed to have a large input range. This significantly increases the circuit cost and design difficulty of the image sensing circuit 102. Thus, an image sensing method with adjustment of exposure time is usually applied to solve this problem. Please refer to FIG. 4, which is a flowchart of a general image sensing process 40 where the exposure time may be adjusted. The image sensing process 40 includes the following steps:

Step 400: Start.

Step 402: The image sensing circuit 102 receives a configuration of exposure time from the host and configures the exposure time accordingly.

Step 404: The image sensing circuit 102 resets a plurality of sensing pixels of the panel 104.

Step 406: The plurality of sensing pixels perform exposure.

Step 408: The image sensing circuit 102 receives a plurality of sensing signals from the plurality of sensing pixels.

Step 410: The image sensing circuit 102 sends image data corresponding to the plurality of sensing signals to the host.

Step 412: The host determines whether the exposure time is appropriate according to the image data. If yes, go to Step 414; otherwise, go to Step 402.

Step 414: The host performs fingerprint recognition according to the image data.

Step 416: End.

According to the image sensing process 40, before the exposure starts, the host may send a request of fingerprint sensing to the image sensing circuit 102, or the image sensing circuit 102 may detect a finger put on the panel 104 and then enable the fingerprint sensing function. Subsequently, the host may send related configuration of exposure time to the image sensing circuit 102, and the image sensing circuit 102 configures the exposure time accordingly. The image sensing circuit 102 may reset the sensing pixels. In the reset step, the voltage of the image sensing element such as the sensing voltage VFPS is pre-charged to a default level. Based on the in-display fingerprint sensing function, it is preferable to only perform fingerprint image sensing using the sensing pixels on which the finger is put, and the sensing signals of these sensing pixels are generated after exposure. The image sensing circuit 102 then receives the sensing signals through the sensing lines connected between the image sensing circuit 102 and these sensing pixels. The sensing signals may be voltage or current signals obtained through the voltage mode and current mode sensing methods as mentioned above. After receiving the sensing signals, the image sensing circuit 102 may generate corresponding image data and send the image data to the host. The host may be configured with an algorithm capable of recognizing the image data to determine whether the exposure time is appropriate and determine whether the image data match with a previously stored fingerprint image.

In general, the image sensing circuit 102 may not know the ambient light intensity and may configure the exposure time to a predetermined value. For example, the fingerprint recognition may be performed together with display of the panel 104 in an integration system of fingerprint and display. Therefore, a time division scheme is applied to perform the fingerprint sensing operation and the display operation in different time slots. In an embodiment, displaying an image frame occupies 16 milliseconds (ms), and the image sensing circuit 102 may receive the fingerprint sensing signals every 2 frame of display time; hence, the predetermined exposure time may be equal to 32 ms.

Figure 5:
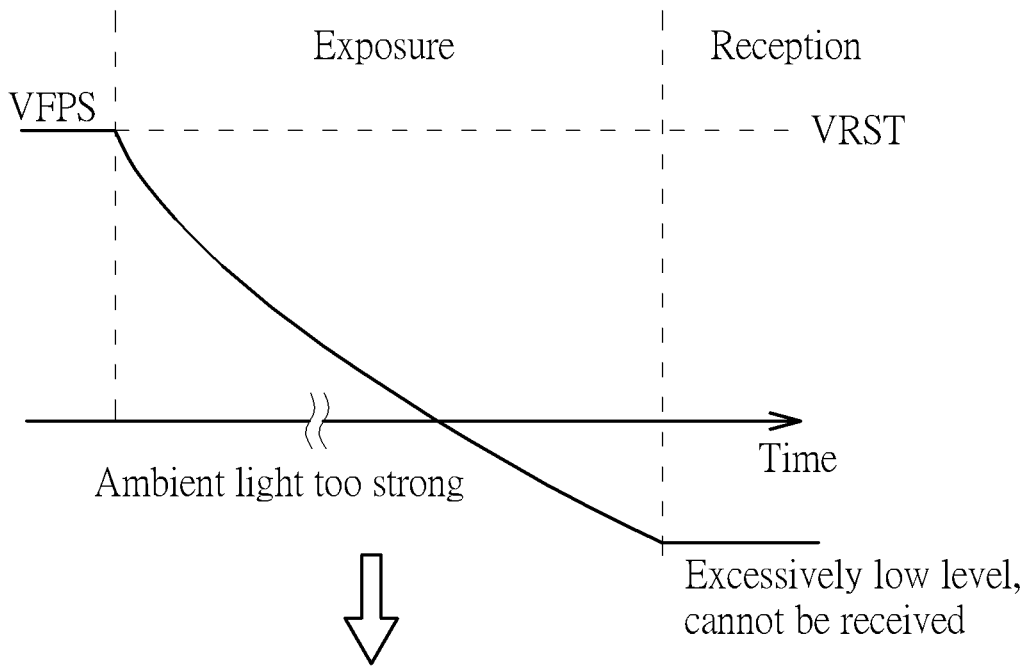
FIG. 5 illustrates that the exposure time is too long such that the host decreases the exposure time.
Figure 5:
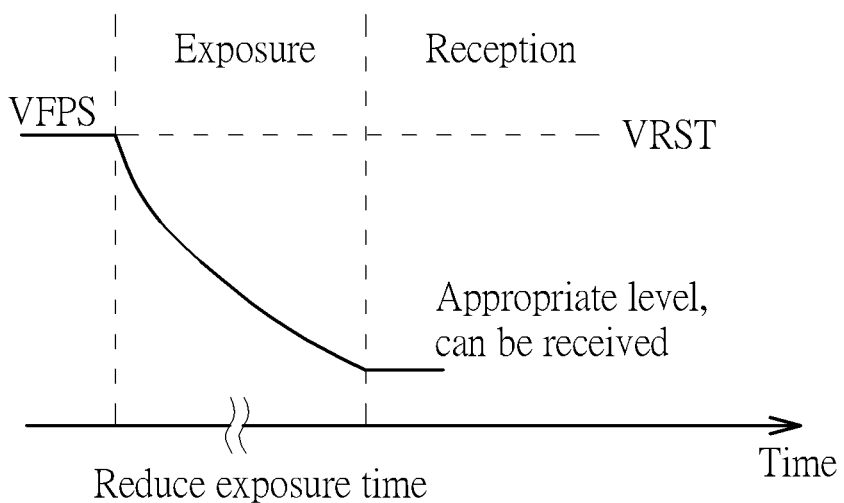

As mentioned above, if the ambient light is too strong and sensed by the image sensing element in the sensing pixels, the sensing voltage VFPS may fall to an excessively low level such that the sensing voltage or current cannot be successfully or correctly received by the image sensing circuit 102, as shown in FIG. 5. Therefore, after receiving the image data from the image sensing circuit 102, the host may determine that the exposure time is too long, and thus decrease the exposure time (e.g., decrease to 16 ms) and then instruct the image sensing circuit 102 to perform Steps 404 to 410 again. The flow may proceed to the end if the host determines that the exposure time is appropriate. For example, with less exposure time, the sensing voltage VFPS received by the image sensing circuit 102 may be in an appropriate level after exposure, so that the corresponding sensing signals can be successfully received by the image sensing circuit 102, as shown in FIG. 5.

According to the image sensing process 40, the exposure flow should iterate at least two times if the exposure time is not appropriate, where a frame of image sensing data is obtained with inappropriate exposure time and should be discarded. The multiple exposure time and the communication time between the image sensing circuit 102 and the host degrade the speed of fingerprint sensing. In such a situation, the user may easily feel that the fingerprint recognition function is not smooth under a large variation of the ambient light.

Therefore, the present invention provides a novel image sensing method to increase the speed of fingerprint sensing and thereby improve the user experience. According to the embodiments of the present invention, there is no need to restart the exposure operation for the same sensing pixels. The image sensing circuit 102 may voluntarily determine whether the received sensing signals are within its normal operation range, and thereby adjust a voltage or current supplied to the panel from the image sensing circuit 102 to modify the level of the sensing signals.

Figure 6:
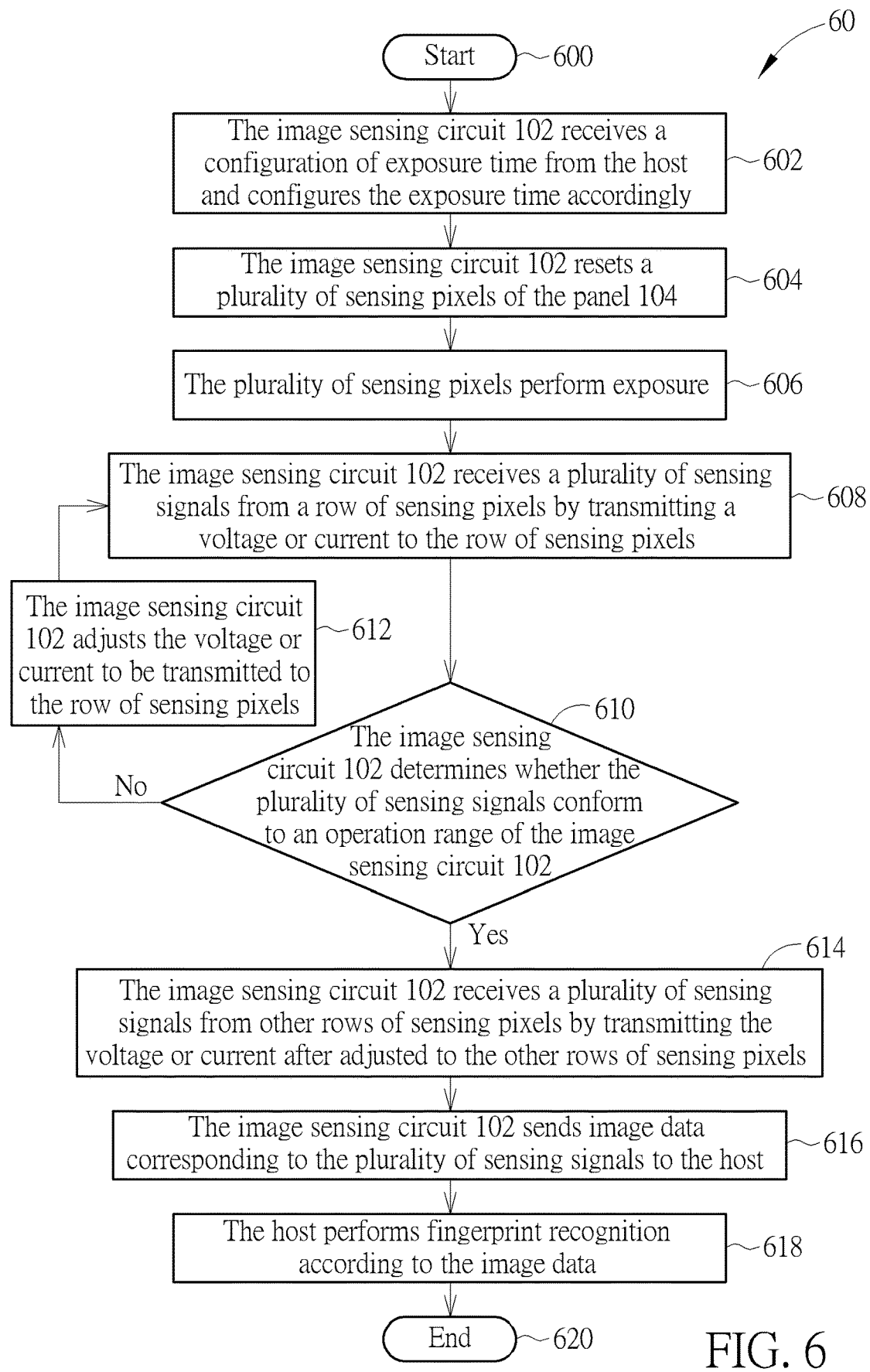
FIG. 6 is a flowchart of an image sensing process according to an embodiment of the present invention.

Please refer to FIG. 6, which is a flowchart of an image sensing process 60 according to an embodiment of the present invention. The image sensing process 60 may be implemented in an image sensing system such as the image sensing system 10 shown in FIG. 1. As shown in FIG. 6, the image sensing process 60 includes the following steps:

Step 600: Start.

Step 602: The image sensing circuit 102 receives a configuration of exposure time from the host and configures the exposure time accordingly.

Step 604: The image sensing circuit 102 resets a plurality of sensing pixels of the panel 104.

Step 606: The plurality of sensing pixels perform exposure.

Step 608: The image sensing circuit 102 receives a plurality of sensing signals from a row of sensing pixels by transmitting a voltage or current to the row of sensing pixels.

Step 610: The image sensing circuit 102 determines whether the plurality of sensing signals conform to an operation range of the image sensing circuit 102. If yes, go to Step 614; otherwise, go to Step 612.

Step 612: The image sensing circuit 102 adjusts the voltage or current to be transmitted to the row of sensing pixels. Then the process returns to Step 608.

Step 614: The image sensing circuit 102 receives a plurality of sensing signals from other rows of sensing pixels by transmitting the voltage or current after adjusted to the other rows of sensing pixels.

Step 616: The image sensing circuit 102 sends image data corresponding to the plurality of sensing signals to the host.

Step 618: The host performs fingerprint recognition according to the image data.

Step 620: End.

According to the image sensing process 60, Steps 600 to 606 are identical to Steps 400 to 406 in the image sensing process 40, and the related operations are detailed in the above paragraphs. After the exposure period, the image sensing circuit 102 may transmit an output voltage or current to a row of sensing pixels of the panel 104, and receive the sensing signals from the row of sensing pixels. Therefore, the received sensing signals may correspond to the transmitted voltage or current.

Please return to refer to FIG. 1. The sensing pixels of the panel 104 are arranged as an array. The image sensing circuit 102 is configured to receive the sensing signals through a plurality of sensing lines, and each sensing line is coupled to a column of sensing pixels. Therefore, during the image sensing process, the sensing signals may be sent to the image sensing circuit 102 by turns, i.e., the sensing signals for the sensing pixels are outputted row by row. In detail, the $1^{st}$ row of sensing pixels may be enabled, and the sensing signals of the $1^{st}$ row of sensing pixels are outputted to the image sensing circuit 102; then, the $2^{nd}$ row of sensing pixels may be enabled, and the sensing signals of the $2^{nd}$ row of sensing pixels are outputted to the image sensing circuit 102; and so on. When a finger is detected, there may be several rows and several columns of sensing pixels are in the area touched by the finger, and the sensing signals of these sensing pixels may be generated and received by the image sensing circuit 102 row by row.

According to the image sensing process 60, the image sensing circuit 102 may receive the sensing signals from a row of sensing pixels, and determine whether the sensing signals corresponding to the row of sensing pixels conform to its operation range. The row of sensing pixels may be those sensing pixels within the specific area touched by the finger in a row. In another embodiment, a predetermined number of rows of sensing pixels may be scanned, and the sensing signals corresponding to the predetermined number of rows of sensing pixels may be obtained and determined whether to conform to the operation range or not. For example, in order to obtain a more reliable determination result, the image sensing circuit 102 may receive the sensing signals corresponding to 2 or 3 rows of sensing pixels and then determine whether the levels of the sensing signals are within the appropriate range. In such a situation, the determination of whether to adjust the output voltage or current may be performed without scanning the entire target area for the fingerprint sensing; instead, only a part of rows less than the entire number of rows of sensing pixels need to be scanned and the corresponding sensing signals are applied to determine their feasibility.

When determining that the sensing signals are excessively high or excessively low and thus may not be successfully or correctly received by the image sensing circuit 102, the image sensing circuit 102 may adjust the output voltage or current transmitted to the sensing pixels of the panel 104, to let the sensing signals to return to the appropriate level, i.e., within the operation range of the image sensing circuit 102. In the image sensing system 10, the image sensing circuit 102 may transmit the common voltage VCOM to the common node of the sensing pixels of the panel 104 (e.g., coupled to the image sensing element in each sensing pixel), and also transmit a bias voltage Vbias or bias current Ibias to the sensing line, to receive the sensing current or voltage from each sensing pixel through the sensing line, as shown in FIGS. 3A and 3B. In order to modify the sensing signals Vs or Is to be conform to the operation range of the image sensing circuit 102, the common voltage VCOM and/or the bias voltage Vbias or bias current Ibias may be adjusted.

Figure 7:
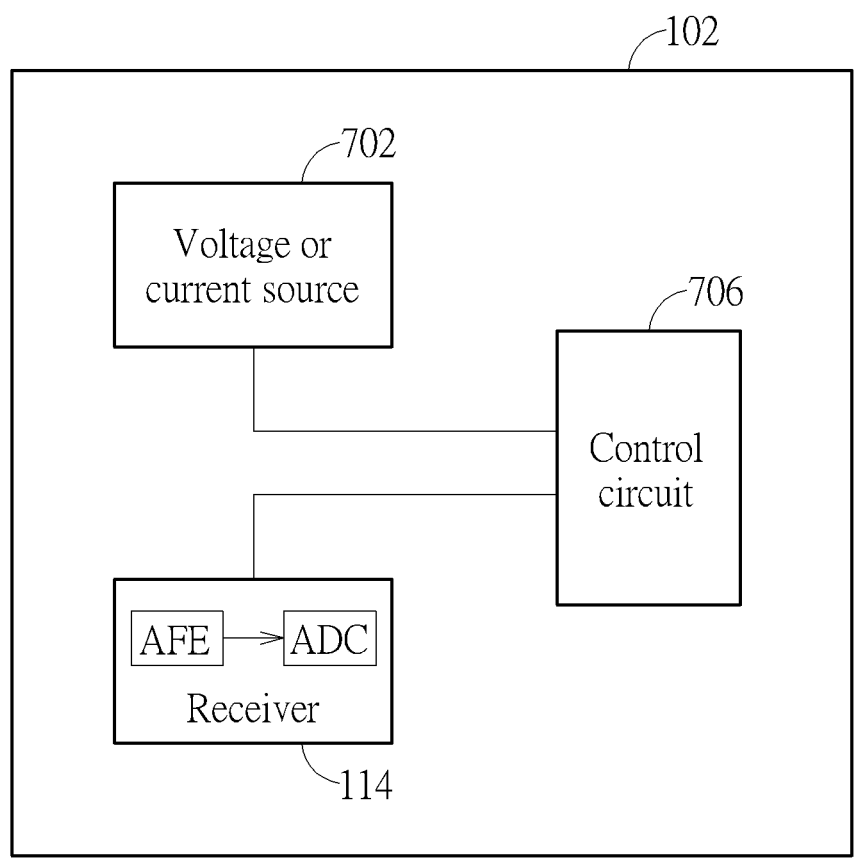
FIG. 7 is a schematic diagram of a detailed implementation of the image sensing circuit.

Please refer to FIG. 7, which is a schematic diagram of a detailed implementation of the image sensing circuit 102. As shown in FIG. 7, the image sensing circuit 102 includes a voltage or current source 702, a control circuit 706 and the receiver 114. The voltage or current source 702 is configured to transmit a voltage or current to the panel 104. In detail, the voltage or current source 702 may include a voltage generator such as the voltage generator 112 shown in FIG. 1, for transmitting the common voltage VCOM to the panel 104. Alternatively or additionally, the voltage or current source 702 may be coupled to the sensing lines of the panel 104, for transmitting the bias current Ibias or the bias voltage Vbias to the sensing lines. The receiver 114 is configured to receive the image sensing signals from the panel 104, where the image sensing signals may correspond to the bias current Ibias or the bias voltage Vbias and correspond to the common voltage VCOM. The received image sensing signals may be the sensing voltage Vs or the sensing current Is as shown in FIGS. 3A and 3B. The control circuit 706, which is coupled to the voltage or current source 702 and the receiver 114, is configured to determine whether the image sensing signals conform to the operation range of the image sensing circuit 102. If the image sensing signals are determined to not conform to the operation range of the image sensing circuit 102, the control circuit 706 may adjust the voltage or current transmitted to the panel 104. This voltage or current may include at least one of the common voltage VCOM, the bias current Ibias and the bias voltage Vbias.

Figure 8:
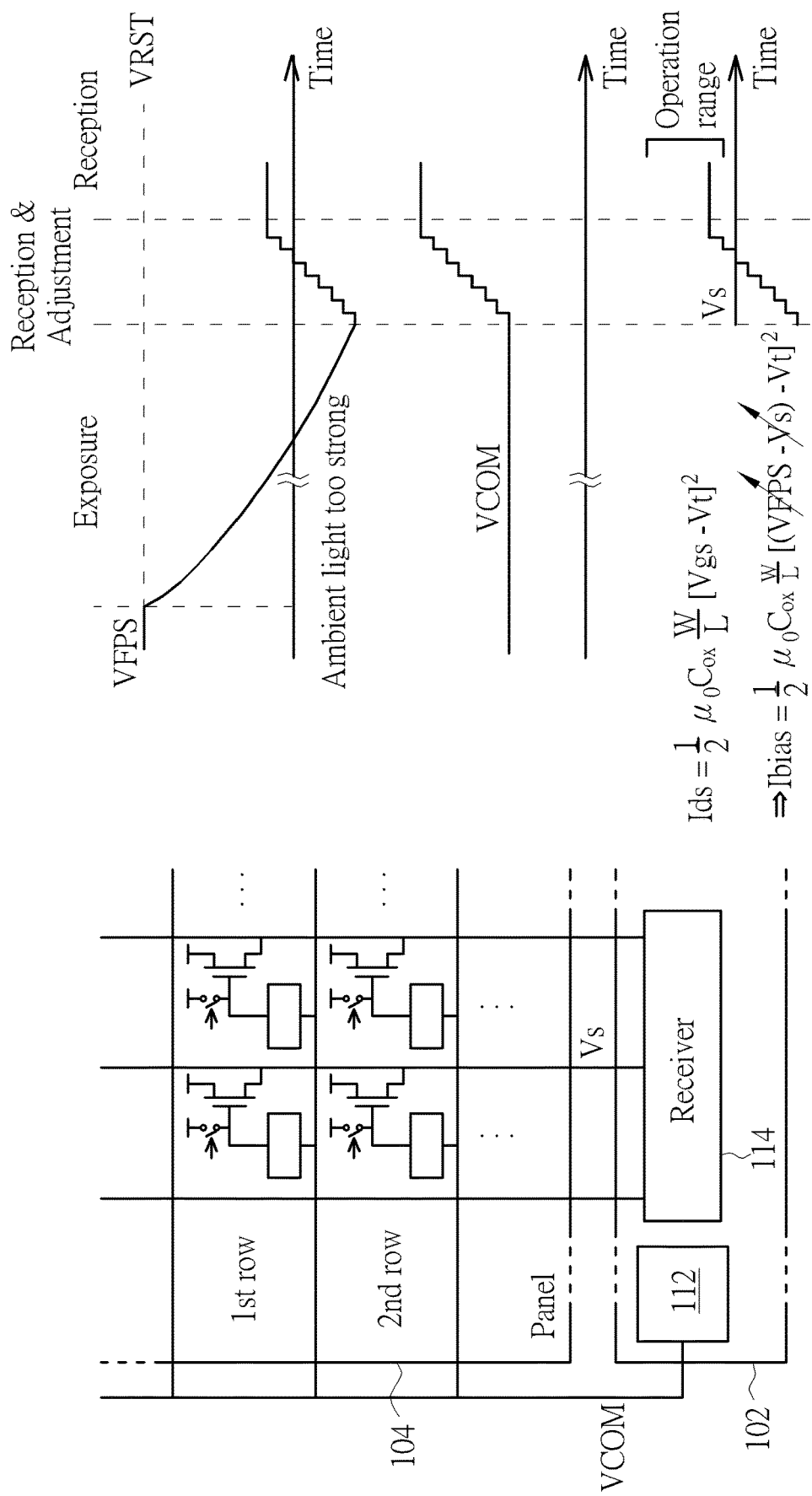
FIG. 8 is a schematic diagram of adjusting the common voltage to let the sensing voltage to conform to the operation range.

In an embodiment, the common voltage VCOM transmitted to the common node of the sensing pixels may be adjusted. Please refer to FIG. 8, which is a schematic diagram of adjusting the common voltage VCOM to let the sensing voltage Vs to conform to the operation range. As shown in FIG. 8, the ambient light intensity may be too strong such that the sensing voltage VFPS falls to an excessively low level; hence, the voltage Vs actually received by the receiver 114 of the image sensing circuit 102 is also in an excessively low level. After the exposure period, the control circuit 706 may detect that the sensing voltage Vs is too low, and thereby increases the level of the common voltage VCOM, which is coupled to one node of the image sensing element; hence, the sensing voltage VFPS at the other node of the image sensing element may also be pushed to a higher level. Based on the MOSFET equation, the sensing voltage VFPS and the sensing voltage Vs may have a fixed voltage difference, and thus the increasing sensing voltage VFPS leads to increasing sensing voltage Vs. The adjustment may be complete if the control circuit 706 detects that the sensing voltage Vs reaches its operation range. As a result, the sensing voltage Vs may be successfully received by the image sensing circuit 102.

Different from the image sensing process 40, in the image sensing process 60, no addition exposure procedure is required, and the appropriate fingerprint sensing signal may be obtained with one-time exposure, which reduces the time consumption for fingerprint sensing and thereby improves the user experience. Note that the exposure time usually equals several tens or hundreds of milliseconds, while the adjustment of output voltage or current transmitted to the panel 104 may be complete in a time unit of microseconds. In addition, the control circuit 706 of the image sensing circuit 102 may determine whether the received voltage or current signal is in the appropriate level, and adjust the output voltage or current (such as the common voltage VCOM or the bias voltage Vbias or bias current Ibias) accordingly. The adjustment may be performed without receiving an adjustment indication from the host. This reduces the time and circuit resources required for the image sensing circuit 102 to communicate with the host.

Please note that the adjustment of output voltage or current is performed based on the determination result of whether the sensing signals corresponding to a row of sensing pixels (or a predetermined number of rows of sensing pixels) are in the operation range. For example, if a part of the sensing signals is lower than the operation range of the image sensing circuit 102, the control circuit 706 may adjust the output voltage or current to increase the part of the sensing signals to be within the operation range; or if a part of the sensing signals is higher than the operation range of the image sensing circuit 102, the control circuit 706 may adjust the output voltage or current to decrease the part of the sensing signals to be within the operation range. The adjustment operation may be triggered if the part of the sensing signals exceeds a specific ratio of the totally received sensing signals in the predetermined number of rows; that is, if more than a specific ratio of the received sensing signals are not within the operation range, the output voltage or current should be adjusted.

After the output voltage or current is adjusted to an appropriate level, the image sensing circuit 102 may start to sense other rows of sensing pixels. That is, the receiver 114 of the image sensing circuit 102 may receive the sensing signals from other rows of sensing pixels by transmitting the voltage or current after adjusted to the other rows of sensing pixels. For example, if the control circuit 706 determines that the received sensing signals corresponding to the first row of sensing pixels are not in the appropriate operation range by transmitting a first voltage or current value to the first row of sensing pixels, the control circuit 102 may determine to adjust the first voltage or current value. Subsequently, after the first voltage or current value is adjusted to a second voltage or current value that allows the sensing signals to be conform to the operation range, the control circuit 706 may determine that the second voltage or current value is feasible, and thereby transmit the second voltage or current value for receiving the sensing signals.

In the embodiment as shown in FIG. 6, after the predetermined number of rows are scanned and the corresponding sensing signals are received and the output voltage or current is adjusted from a first value to a second value, the image sensing circuit 102 may restart to scan the $1^{st}$ row and then go through each row of sensing pixels, in order to obtain the whole fingerprint sensing signals by transmitting the output voltage or current having the appropriate value (i.e., the second value). Note that the present invention is not limited thereto. In another embodiment, after the output voltage or current is adjusted from a first value to a second value, the image sensing circuit 102 may directly proceed to scan other rows and receive the sensing signals corresponding to the other rows by transmitting the output voltage or current with the second value.

After the output voltage or current is adjusted to an appropriate value, the image sensing circuit 102 may obtain the sensing signals in an appropriate level. The image data corresponding to the sensing signals may be sent to the host, allowing the host to perform fingerprint recognition.

Please note that the present invention aims at providing an image sensing method and system which are capable of receiving the image sensing signals by adjusting the common voltage or bias voltage or current outputted to the panel. Those skilled in the art may make modifications and alternations accordingly. For example, the image sensing method of the present invention may be applied to any type of panel such as a liquid crystal display (LCD) panel, an organic light-emitting diode (OLED) panel, or the like. In fact, any display panel integrated with the optical fingerprint sensing function is able to apply the image sensing method provided in the present invention. In addition, the pixel structure shown in FIG. 1 is only one of various embodiments of the present invention. Those skilled in the art should understand that the sensing pixels may be implemented with another structure. Further, in the above embodiment as shown in FIG. 8, the control circuit 706 adjusts the common voltage of the sensing pixels to move the sensing signals to the appropriate level. In another embodiment, the control circuit 706 may adjust a bias voltage or current transmitted to the sensing line to move the sensing signals to the appropriate level. The fingerprint recognition may be performed to achieve fast unlocking, identity recognition, network payment, or any other possible functions, which should not be a limitation of the scope of the present invention.

Figure 9:
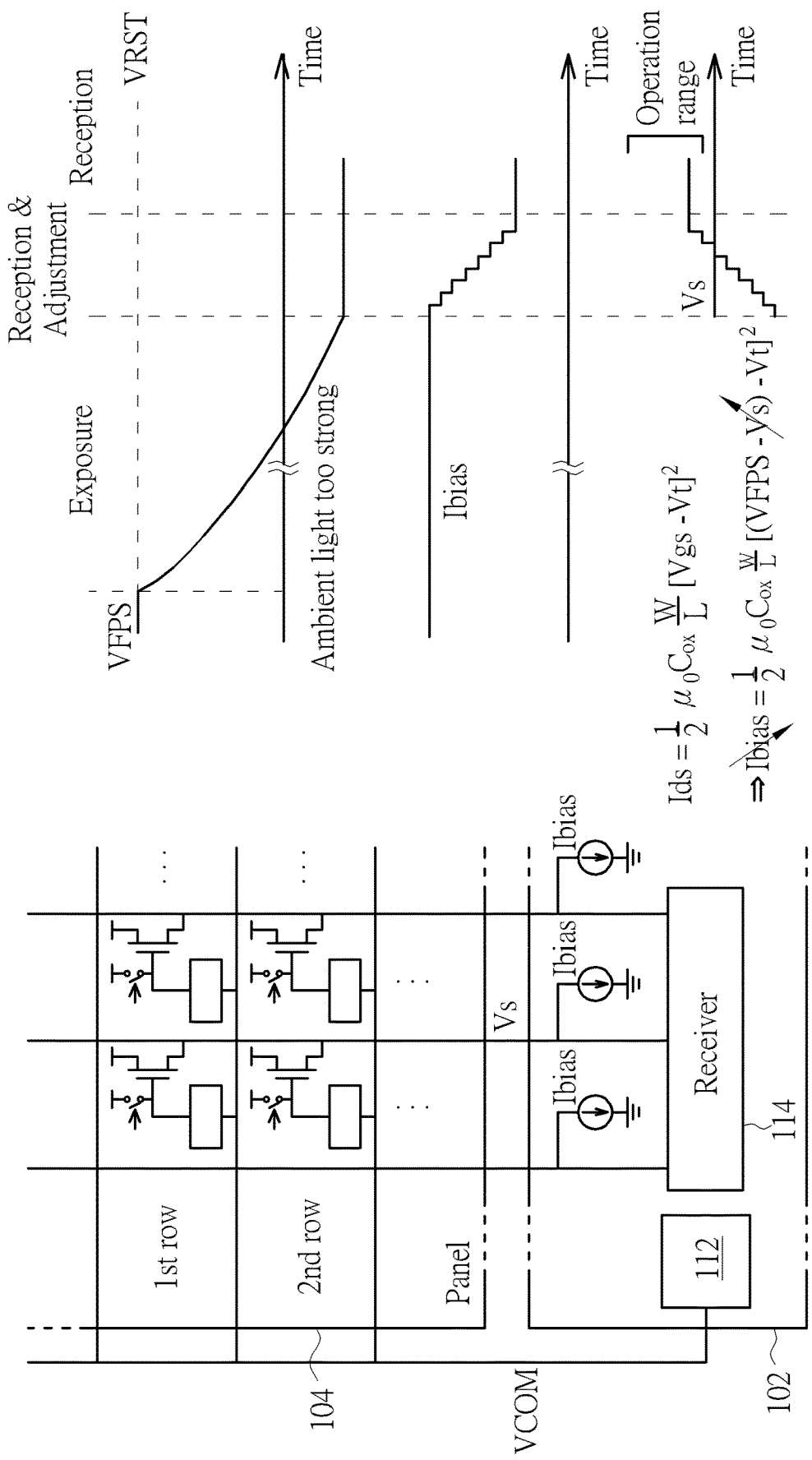
FIGS. 9 and 10 are schematic diagrams of adjusting the bias current to let the sensing voltage to conform to the operation range.

Please refer to FIG. 9, which is a schematic diagram of adjusting the bias current Ibias to let the sensing voltage Vs to conform to the operation range. As shown in FIG. 9, the image sensing circuit 102 may include a plurality of current sources (which may be included in the voltage or current source 702), each providing a bias current Ibias for a sensing line coupled to a column of sensing pixels of the panel 104. In this embodiment, the ambient light intensity may be too strong such that the sensing voltage VFPS falls to an excessively low level; hence, the voltage Vs actually received by the receiver 114 of the image sensing circuit 102 is also in an excessively low level. After the exposure period, the control circuit 706 may detect that the sensing voltage Vs is too low, and thereby decreases the level of the bias current Ibias. Based on the MOSFET equation, the bias current Ibias may be in positive correlation to the gate-to-source voltage Vgs of the control transistor MFPS. Therefore, the decreasing bias current Ibias leads to the decreasing gate-to-source voltage Vgs. With a fixed value of the sensing voltage VFPS, the sensing voltage Vs at the source terminal of the control transistor MFPS may increase. The adjustment may be complete if the control circuit 706 detects that the sensing voltage Vs reaches its operation range. As a result, the sensing voltage Vs may be successfully received by the image sensing circuit 102.

Please note that the bias current Ibias for each column of sensing pixels should be adjusted to the same value simultaneously. The finally obtained fingerprint image should be able to reflect the peak and valley information of the finger, which is carried in a tiny difference between the sensing signals obtained from adjacent sensing pixels. Therefore, each sensing pixel should possess the same voltage or current parameter such as the bias current Ibias, allowing the sensing signals to be generated correctly.

Figure 10:
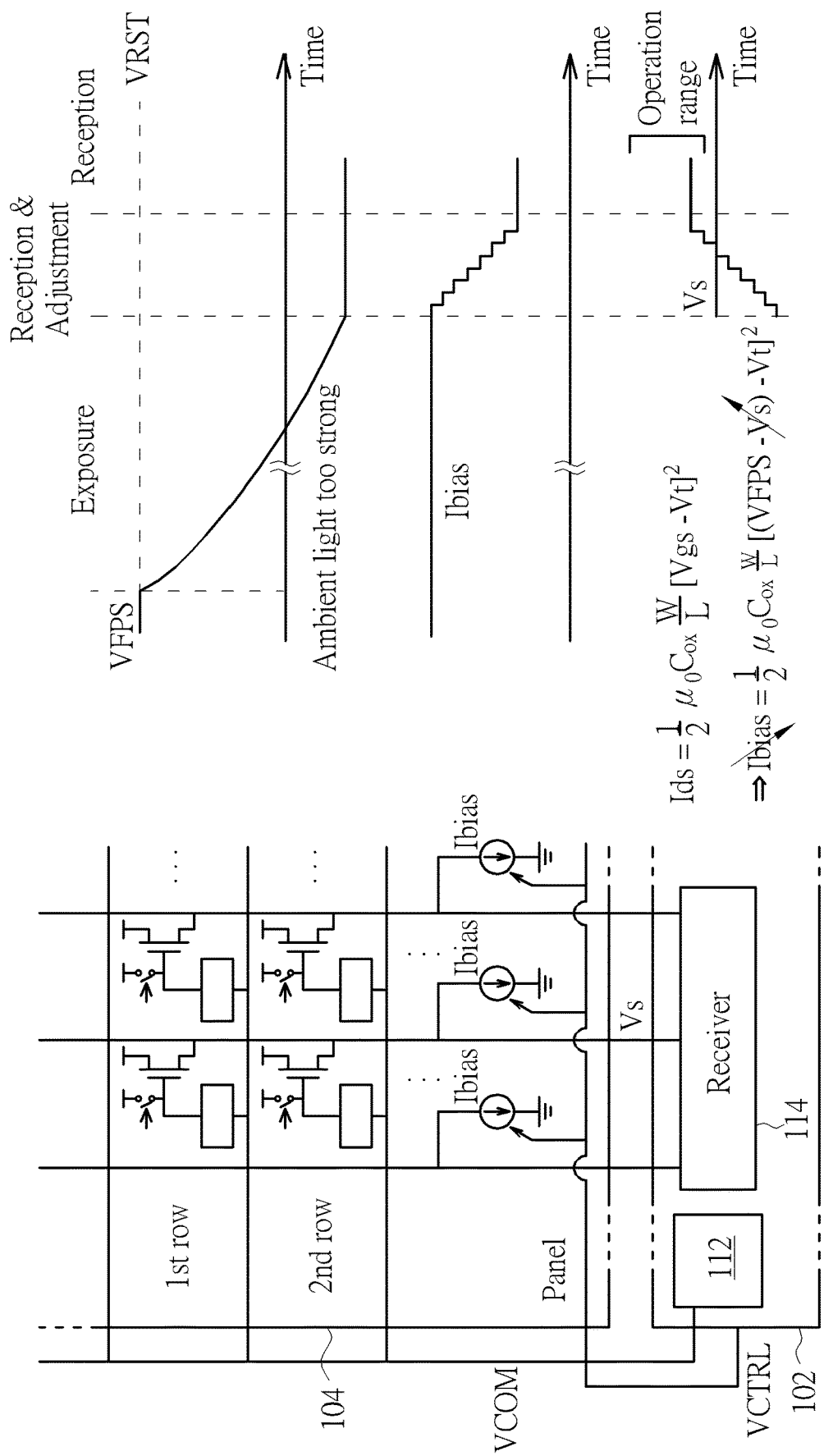

In another embodiment, the bias current Ibias may be realized in another manner, as shown in FIG. 10. The image sensing system shown in FIG. 10 is different from the image sensing system shown in FIG. 9 in that, in the image sensing system shown in FIG. 10, the bias current Ibias is implemented in the panel 104 instead of the image sensing circuit 102. The image sensing circuit 102 may further send a control signal VCTRL to the panel 104, to control the level of the bias current Ibias. The image sensing method performed in FIG. 10 is a voltage mode sensing as similar to the method performed in FIG. 9. The related operations are illustrated in the above paragraphs, and will be omitted herein.

Figure 11:
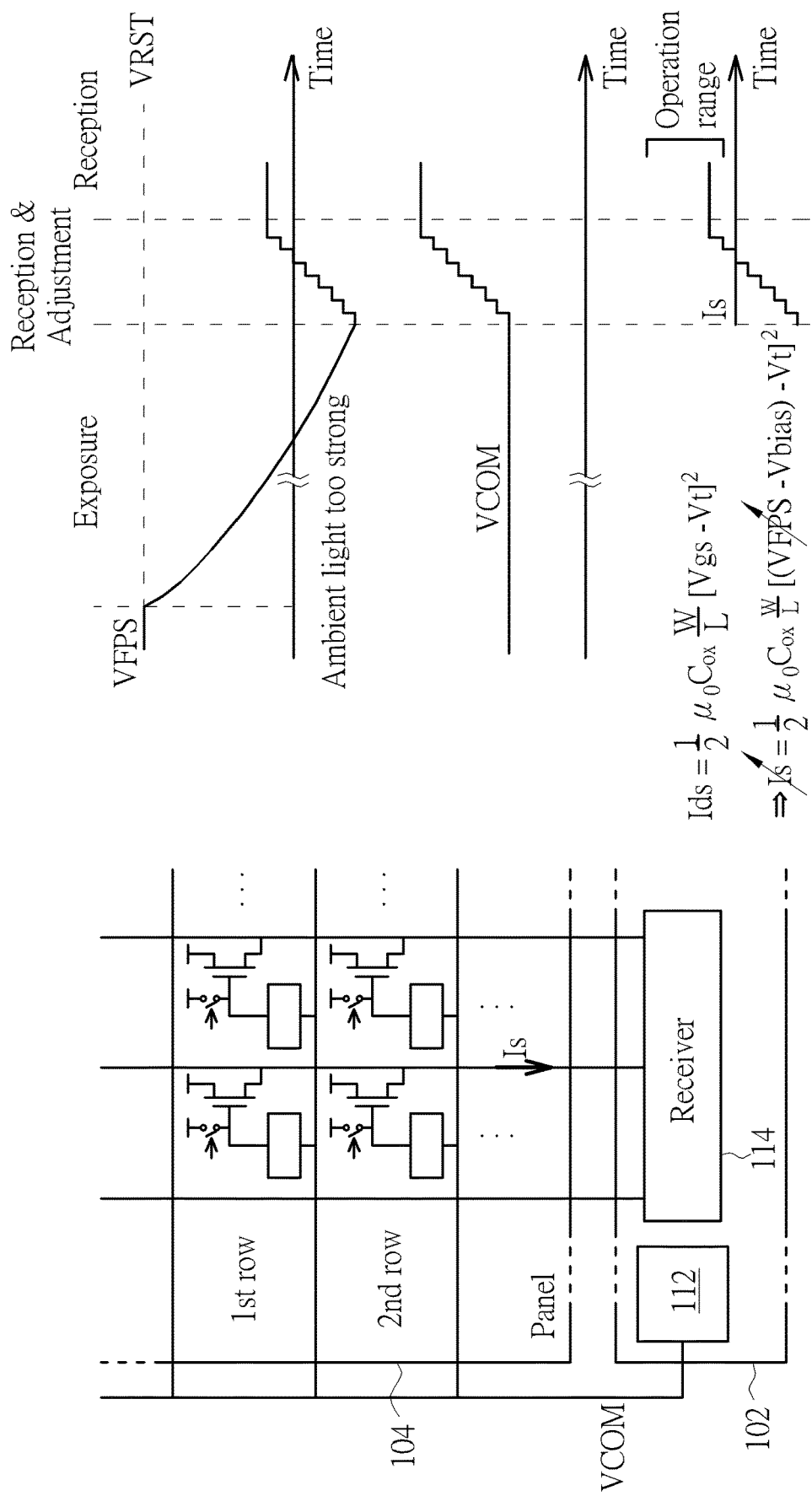
FIG. 11 is a schematic diagram of adjusting the common voltage to let the sensing current to conform to the operation range.

As mentioned above, the current mode sensing method is also applicable to deal with the situation where the sensed light intensity generates inappropriate level of sensing currents after exposure. Please refer to FIG. 11, which is a schematic diagram of adjusting the common voltage VCOM to let the sensing current Is to conform to the operation range. As shown in FIG. 11, the ambient light intensity may be too strong such that the sensing voltage VFPS falls to an excessively low level; hence, the current Vs actually received by the receiver 114 of the image sensing circuit 102 is also in an excessively low level. After the exposure period, the control circuit 706 may detect that the sensing current Is is too low, and thereby increases the level of the common voltage VCOM, which is coupled to one node of the image sensing element; hence, the sensing voltage VFPS at the other node of the image sensing element may also be pushed to a higher level. Based on the MOSFET equation, the sensing voltage VFPS is in positive correlation to the sensing current Is, and thus the increasing sensing voltage VFPS leads to increasing sensing current Is. The adjustment may be complete if the control circuit 706 detects that the sensing current Is reaches its operation range. As a result, the sensing current Is may be successfully received by the image sensing circuit 102.

Figure 12:
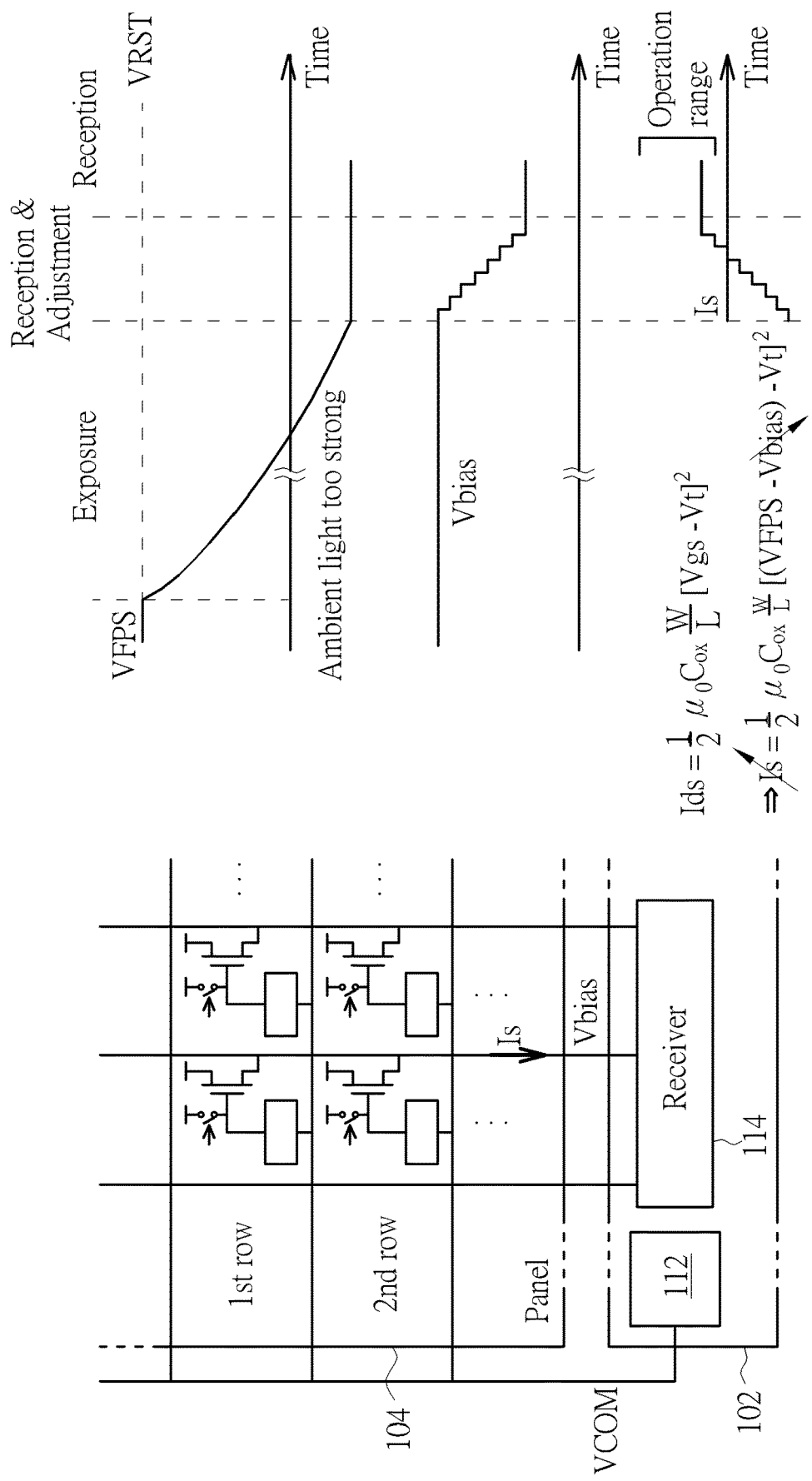
FIG. 12 is a schematic diagram of adjusting the bias voltage to let the sensing current to conform to the operation range.

Please refer to FIG. 12, which is a schematic diagram of adjusting the bias voltage Vbias to let the sensing current to conform to the operation range. As shown in FIG. 12, the voltage or current source 702 of the image sensing circuit 102 may output the bias voltage Vbias to the sensing line coupled to each column of sensing pixels of the panel 104, and the receiver 114 of the image sensing circuit 102 may thereby receive the sensing current Is through the sensing line. In this embodiment, the ambient light intensity may be too strong such that the sensing voltage VFPS falls to an excessively low level; hence, the current Is actually received by the receiver 114 of the image sensing circuit 102 is also in an excessively low level. After the exposure period, the control circuit 706 may detect that the sensing current Is is too low, and thereby decreases the level of the bias voltage Vbias. Based on the MOSFET equation, the bias voltage Vbias is coupled to the source terminal of the control transistor MFPS. Therefore, the decreasing bias voltage Vbias leads to the increasing gate-to-source voltage Vgs of the control transistor MFPS. With a fixed value of the sensing voltage VFPS, the sensing current Is may increase with the falling bias voltage Vbias. The adjustment may be complete if the control circuit 706 detects that the sensing current Is reaches its operation range. As a result, the sensing current Is may be successfully received by the image sensing circuit 102.

According to the image sensing method of the present invention, the sensing signals may be adjusted to an appropriate level by adjusting an output voltage or current transmitted to the sensing pixels of the panel; hence, additional exposure period or repeated exposure may not be required. Although this image sensing method may not be successfully performed under any exposure conditions such as extremely high or low ambient light intensity, a larger range of sensing signals may still be recognizable or adjustable by the control circuit 706 of the image sensing circuit 102. The embodiments of the present invention have the benefits of increasing the speed of fingerprint sensing, so as to improve the user experience of fingerprint recognition. Also, if the sensing signals are successfully moved to an appropriate level receivable by the image sensing circuit 102, no image sensing signal or image data may be wasted. In addition, with the image sensing method of the present invention, the AFE circuit and/or the ADC included in the receiver 114 are not required to have a larger operable range or input range; this may reduce the circuit costs and design complexity of the image sensing circuit 102.

To sum up, the present invention provides an image sensing method allowing the image sensing circuit to obtain the sensing signals with an appropriate level by transmitting and adjusting a voltage or current outputted to the sensing pixels of the panel. The sensing signals may be a voltage signal or a current signal obtained using a voltage mode sensing method or a current mode sensing method. After exposure of the sensing pixels, the image sensing circuit may determine whether the received sensing signals conform to its operation range, such as the input range of the AFE circuit and/or the ADC. Subsequently, the image sensing circuit may adjust the output voltage or current, in order to move the sensing signals to the appropriate level adaptive to the operation range of the image sensing circuit. In an embodiment, the common voltage transmitted to the common node of each sensing pixel may be adjusted. Alternatively or additionally, the bias voltage or current transmitted to the sensing line coupled to the sensing pixels may be adjusted. Note that the output voltage or current to be adjusted should not be limited herein. As long as the voltage or current may be adjusted to let the sensing signals received by the image sensing circuit to enter an appropriate range, the adjustment may be feasible and should belong to the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensing system, comprising:
a panel, comprising a plurality of sensing pixels; and
an image sensing circuit, coupled to the panel, the image sensing circuit comprising:
a voltage or current source, configured to transmit a first voltage or current to the panel;
a receiver, configured to receive a plurality of sensing signals from the panel, wherein the plurality of sensing signals correspond to the first voltage or current; and
a control circuit, coupled to the voltage or current source and the receiver, configured to determine whether the plurality of sensing signals conform to an operation range of the image sensing circuit, and adjust the first voltage or current when the plurality of sensing signals are determined to be not conform to the operation range of the image sensing circuit.

2. The image sensing system of claim 1, wherein the control circuit is configured to perform the following steps to adjust the first voltage or current when the plurality of sensing signals are determined to be not conform to the operation range of the image sensing circuit:
when a first part of the plurality of sensing signals is lower than the operation range of the image sensing circuit, adjusting the first voltage or current to increase the first part of the plurality of sensing signals to be within the operation range of the image sensing circuit; or
when a second part of the plurality of sensing signals is higher than the operation range of the image sensing circuit, adjusting the first voltage or current to decrease the second part of the plurality of sensing signals to be within the operation range of the image sensing circuit.

3. The image sensing system of claim 1, wherein the first voltage or current is a bias voltage or current transmitted to a sensing line of the panel.

4. The image sensing system of claim 1, wherein the first voltage or current is a common voltage transmitted to a common node of the plurality of sensing pixels of the panel.

5. The image sensing system of claim 1, wherein the plurality of sensing signals further correspond to light intensity sensed by at least one of the plurality of sensing pixels of the panel.

6. The image sensing system of claim 1, wherein the receiver comprises an analog front-end circuit and an analog-to-digital converter, and the operation range of the image sensing circuit comprises at least one of an input range of the analog front-end circuit and an input range of the analog-to-digital converter.

7. The image sensing system of claim 1, wherein the plurality of sensing pixels comprises a plurality of rows of sensing pixels, the image sensing circuit is configured to sense the plurality of rows of sensing pixels to receive the plurality of sensing signals corresponding to each row of the plurality of rows of sensing pixels, and the control circuit is configured to perform the following step to determine whether the plurality of sensing signals conform to the operation range of the image sensing circuit:
determining whether the plurality of sensing signals corresponding to a predetermined number of rows among the plurality of rows of sensing pixels conform to the operation range of the image sensing circuit after the plurality of sensing signals corresponding to the predetermined number of rows of sensing pixels are received.

8. The image sensing system of claim 7, wherein the control circuit is configured to perform the following step to adjust the first voltage or current when the plurality of sensing signals are determined to be not conform to the operation range of the image sensing circuit:
adjusting the first voltage or current to a second voltage or current when the plurality of sensing signals, which are obtained by the voltage or current source transmitting the first voltage or current and corresponding to the predetermined number of rows of sensing pixels, are determined to be not conform to the operation range of the image sensing circuit;
wherein the second voltage or current allows the plurality of sensing signals to be conform to the operation range of the image sensing circuit.

9. The image sensing system of claim 8, wherein the image sensing circuit is further configured to perform the following step:
receiving, by the receiver, the plurality of sensing signals corresponding to at least one row other than the predetermined number of rows among the plurality of rows of sensing pixels when the voltage or current source transmits the second voltage or current to the panel.

10. The image sensing system of claim 8, wherein the image sensing circuit is further configured to perform the following step:
receiving, by the receiver, the plurality of sensing signals corresponding to each of the plurality of rows of sensing pixels when the voltage or current source transmits the second voltage or current to the panel.

11. The image sensing system of claim 7, wherein the predetermined number is less than an entire number of rows among the plurality of rows of sensing pixels.

12. The image sensing system of claim 1, further comprising a host coupled to the image sensing circuit, wherein the control circuit is configured to adjust the first voltage or current without receiving an adjustment indication from the host.

13. An image sensing circuit, comprising:
a voltage or current source, configured to transmit a first voltage or current to a panel;
a receiver, configured to receive a plurality of sensing signals from the panel, wherein the plurality of sensing signals correspond to the first voltage or current;
a control circuit, coupled to the voltage or current source and the receiver, configured to determine whether the plurality of sensing signals conform to an operation range of the image sensing circuit, and adjust the first voltage or current when the plurality of sensing signals are determined to be not conform to the operation range of the image sensing circuit.

14. The image sensing circuit of claim 13, wherein the control circuit is configured to perform the following steps to adjust the first voltage or current when the plurality of sensing signals are determined to be not conform to the operation range of the image sensing circuit:
when a first part of the plurality of sensing signals is lower than the operation range of the image sensing circuit, adjusting the first voltage or current to increase the first part of the plurality of sensing signals to be within the operation range of the image sensing circuit; or
when a second part of the plurality of sensing signals is higher than the operation range of the image sensing circuit, adjusting the first voltage or current to decrease the second part of the plurality of sensing signals to be within the operation range of the image sensing circuit.

15. The image sensing circuit of claim 13, wherein the first voltage or current is a bias voltage or current transmitted to a sensing line of the panel.

16. The image sensing circuit of claim 13, wherein the first voltage or current is a common voltage transmitted to a common node of a plurality of sensing pixels of the panel.

17. The image sensing circuit of claim 13, wherein the plurality of sensing signals further correspond to light intensity sensed by at least one of a plurality of sensing pixels of the panel.

18. The image sensing circuit of claim 13, wherein the receiver comprises an analog front-end circuit and an analog-to-digital converter, and the operation range of the image sensing circuit comprises at least one of an input range of the analog front-end circuit and an input range of the analog-to-digital converter.

19. The image sensing circuit of claim 13, wherein the panel comprises a plurality of rows of sensing pixels, the image sensing circuit is configured to sense the plurality of rows of sensing pixels to receive the plurality of sensing signals corresponding to each row of the plurality of rows of sensing pixels, and the control circuit is configured to perform the following step to determine whether the plurality of sensing signals conform to the operation range of the image sensing circuit:
determining whether the plurality of sensing signals corresponding to a predetermined number of rows among the plurality of rows of sensing pixels conform to the operation range of the image sensing circuit after the plurality of sensing signals corresponding to the predetermined number of rows of sensing pixels are received.

20. The image sensing circuit of claim 19, wherein the control circuit is configured to perform the following step to adjust the first voltage or current when the plurality of sensing signals are determined to be not conform to the operation range of the image sensing circuit:
adjusting the first voltage or current to a second voltage or current when the plurality of sensing signals, which are obtained by the voltage or current source transmitting the first voltage or current and corresponding to the predetermined number of rows of sensing pixels, are determined to be not conform to the operation range of the image sensing circuit;
wherein the second voltage or current allows the plurality of sensing signals to be conform to the operation range of the image sensing circuit.

21. The image sensing circuit of claim 20, wherein the image sensing circuit is further configured to perform the following step:
receiving, by the receiver, the plurality of sensing signals corresponding to at least one row other than the predetermined number of rows among the plurality of rows of sensing pixels when the voltage or current source transmits the second voltage or current to the panel.

22. The image sensing circuit of claim 20, wherein the image sensing circuit is further configured to perform the following step:
receiving, by the receiver, the plurality of sensing signals corresponding to each of the plurality of rows of sensing pixels when the voltage or current source transmits the second voltage or current to the panel.

23. The image sensing circuit of claim 19, wherein the predetermined number is less than an entire number of rows among the plurality of rows of sensing pixels.

24. The image sensing circuit of claim 13, wherein the control circuit is configured to adjust the first voltage or current without receiving an adjustment indication from a host coupled to the image sensing circuit.

25. A method of sensing an image from a panel for an image sensing circuit, comprising:
transmitting a first voltage or current to the panel;
receiving a plurality of sensing signals from the panel, wherein the plurality of sensing signals correspond to the first voltage or current;
determining whether the plurality of sensing signals conform to an operation range of the image sensing circuit; and
adjusting the first voltage or current when the plurality of sensing signals are determined to be not conform to the operation range of the image sensing circuit.

26. The method of claim 25, wherein the step of adjusting the first voltage or current when the plurality of sensing signals are determined to be not conform to the operation range of the image sensing circuit comprises:
when a first part of the plurality of sensing signals is lower than the operation range of the image sensing circuit, adjusting the first voltage or current to increase the first part of the plurality of sensing signals to be within the operation range of the image sensing circuit; or
when a second part of the plurality of sensing signals is higher than the operation range of the image sensing circuit, adjusting the first voltage or current to decrease the second part of the plurality of sensing signals to be within the operation range of the image sensing circuit.

27. The method of claim 25, wherein the first voltage or current is a bias voltage or current transmitted to a sensing line of the panel.

28. The method of claim 25, wherein the first voltage or current is a common voltage transmitted to a common node of a plurality of sensing pixels of the panel.

29. The method of claim 25, wherein the plurality of sensing signals further correspond to light intensity sensed by at least one of a plurality of sensing pixels of the panel.

30. The method of claim 25, wherein the operation range of the image sensing circuit comprises at least one of an input range of an analog front-end circuit and an input range of an analog-to-digital converter of the image sensing circuit.

31. The method of claim 25, wherein the image sensing circuit is configured to sense a plurality of rows of sensing pixels of the panel to receive the plurality of sensing signals corresponding to each row of the plurality of rows of sensing pixels, and the method further comprises:
determining whether the plurality of sensing signals corresponding to a predetermined number of rows among the plurality of rows of sensing pixels conform to the operation range of the image sensing circuit after the plurality of sensing signals corresponding to the predetermined number of rows of sensing pixels are received.

32. The method of claim 31, wherein the step of adjusting the first voltage or current when the plurality of sensing signals are determined to be not conform to the operation range of the image sensing circuit comprises:
adjusting the first voltage or current to a second voltage or current when the plurality of sensing signals, which are obtained by transmitting the first voltage or current and corresponding to the predetermined number of rows of sensing pixels, are determined to be not conform to the operation range of the image sensing circuit;
wherein the second voltage or current allows the plurality of sensing signals to be conform to the operation range of the image sensing circuit.

33. The method of claim 32, further comprising:
receiving the plurality of sensing signals corresponding to at least one row other than the predetermined number of rows among the plurality of rows of sensing pixels by transmitting the second voltage or current to the panel.

34. The method of claim 32, further comprising:
receiving the plurality of sensing signals corresponding to each of the plurality of rows of sensing pixels by transmitting the second voltage or current to the panel.

35. The method of claim 31, wherein the predetermined number is less than an entire number of rows among the plurality of rows of sensing pixels.

36. The method of claim 25, wherein the first voltage or current is adjusted by the image sensing circuit without an adjustment indication received from a host coupled to the image sensing circuit.

* * * * *